US012103737B2

(12) United States Patent
Kuge et al.

(10) Patent No.: US 12,103,737 B2
(45) Date of Patent: Oct. 1, 2024

(54) RECTANGULAR-BOTTOMED PACKAGING BAG, AND METHOD FOR MANUFACTURING RECTANGULAR-BOTTOMED PACKAGING BAG

(71) Applicant: HOSOKAWA YOKO CO., LTD., Tokyo (JP)

(72) Inventors: Raizo Kuge, Hanno (JP); Kazuhiro Umenaka, Fujimino (JP); Sho Obara, Koshigaya (JP)

(73) Assignee: HOSOKAWA YOKO CO., LTD., Tokyo (JP)

( * ) Notice: Subject to any disclaimer, the term of this patent is extended or adjusted under 35 U.S.C. 154(b) by 0 days.

(21) Appl. No.: 17/908,546

(22) PCT Filed: Mar. 25, 2021

(86) PCT No.: PCT/JP2021/012545
§ 371 (c)(1),
(2) Date: Sep. 1, 2022

(87) PCT Pub. No.: WO2021/193827
PCT Pub. Date: Sep. 30, 2021

(65) Prior Publication Data

US 2023/0145096 A1 May 11, 2023

(30) Foreign Application Priority Data

Mar. 26, 2020 (JP) ................................ 2020-056460

(51) Int. Cl.
*B65D 30/20* (2006.01)
*B31B 70/26* (2017.01)
(Continued)

(52) U.S. Cl.
CPC .............. *B65D 31/10* (2013.01); *B31B 70/26* (2017.08); *B31B 70/60* (2017.08); *B65D 31/16* (2013.01);
(Continued)

(58) Field of Classification Search
CPC ........ B65D 31/10; B65D 31/16; B65D 33/25; B31B 70/26; B31B 70/60; B31B 2150/25
(Continued)

(56) References Cited

U.S. PATENT DOCUMENTS 2,985,355 A * 5/1961 Read .................... B65D 33/105 383/122
3,136,475 A * 6/1964 Geimer .................. B65D 31/08 383/122
(Continued)

FOREIGN PATENT DOCUMENTS

CH 422501 A 10/1966
EP 0052151 A1 * 5/1982
(Continued)

OTHER PUBLICATIONS

Machine translation of JP2002332049A.*
(Continued)

*Primary Examiner* — Jes F Pascua
(74) *Attorney, Agent, or Firm* — NIXON PEABODY LLP; Jeffrey L. Costellia

(57) ABSTRACT

A rectangular-bottomed packaging bag (1) is a rectangular-bottomed packaging bag formed by folding a sheet material member and includes a rectangular shaped bottom (2) a front (3) and a rear (4) rising from two facing sides of the bottom (2), and a pair of sides (5) connecting the front (3) and the rear (4). The pair of sides (5) each include a first region (31) positioned on the front (3) side, a second region (32) positioned on the rear (4) side, a side joining portion (33)
(Continued)

joining the first region (31) and the second region (32), and an inclined joining portion (34) inclined to the bottom (2) side from the side joining portion (33) toward one of the front (3) and the rear (4) and joining the sheet material member of the first region (31) and the second region (32) overlapping each other in a direction of thickness.

8 Claims, 12 Drawing Sheets

(51) Int. Cl.
*B31B 70/60* (2017.01)
*B65D 30/10* (2006.01)
*B65D 33/25* (2006.01)
*B31B 150/00* (2017.01)

(52) U.S. Cl.
CPC ........ *B65D 33/25* (2013.01); *B31B 2150/001* (2017.08)

(58) Field of Classification Search
USPC .......................................................... 383/120
See application file for complete search history.

(56) References Cited

U.S. PATENT DOCUMENTS

| | | | | |
|---|---|---|---|---|
| 4,041,851 | A * | 8/1977 | Jentsch | B65D 75/008 383/122 |
| 4,837,849 | A | 6/1989 | Erickson et al. | |
| 5,468,206 | A * | 11/1995 | Buchanan | B65D 31/005 493/194 |
| 10,196,192 | B2 | 2/2019 | Gum et al. | |
| 10,399,750 | B1 | 9/2019 | Latour et al. | |
| 2006/0108375 | A1 | 5/2006 | Pritchard | |
| 2010/0317501 | A1* | 12/2010 | Taverna | B31B 70/00 493/267 |
| 2011/0019943 | A1* | 1/2011 | Piraneo | B65D 31/10 493/243 |
| 2023/0113515 | A1* | 4/2023 | Umenaka | B31B 70/10 493/186 |

FOREIGN PATENT DOCUMENTS

| | | |
|---|---|---|
| JP | 10-264944 | 10/1998 |
| JP | 2002-332049 | 11/2002 |
| JP | 2004189283 A | 7/2004 |
| JP | 2005-306382 | 11/2005 |
| JP | 2014162519 A | 9/2014 |
| JP | 2017-056970 | 3/2017 |
| JP | 2018-012297 | 1/2018 |
| JP | 2019-104518 | 6/2019 |

OTHER PUBLICATIONS

Machine translation of JP2005306382A.*
Machine tranlation of JP2018012297A.*
Apr. 1, 2024 EP-0052151-A1 Machine Translation.*
International Search Report for Application No. PCT/JP2021/012545 mailed Apr. 27, 2021, (5 pages).
Chinese Office Action for App. No. 202180023234.6, mailed Jan. 26, 2024 (12 pages) [English Search Report].
Xu et al., World Plastics, No. 7, Application and Performance Analysis of Square Bottom Valve Pockets, Jul. 1, 2010.
Extended European Search Report for App. No. 21774749.2 dated Mar. 28, 2024 (7 pages).

* cited by examiner

RECTANGULAR-BOTTOMED PACKAGING BAG, AND METHOD FOR MANUFACTURING RECTANGULAR-BOTTOMED PACKAGING BAG

TECHNICAL FIELD

The present invention relates to a rectangular-bottomed packaging bag and a method for manufacturing of the rectangular-bottomed packaging bag.

Priority is claimed on Japanese Patent Application No. 2020-056460 filed in Japan on Mar. 26, 2020, the contents of which is incorporated herein by reference.

BACKGROUND ART

Conventionally, as a bag-shaped packaging container having excellent self-standing properties and a large inner volume, a rectangular-bottomed type packaging bag (hereinafter referred to as "rectangular-bottomed packaging bag") including a rectangular bottom and four sides rising from the bottom is known.

Various aspects are disclosed as a structure of the rectangular-bottomed packaging bag.

For example, Patent Literature 1 discloses a configuration of a three-way gusset bag including a half-folded bottom gusset protruding into the bag between the bag front portion and the bag rear portion, side portion gussets provided on both side portions of the bag front portion, the bag rear portion, and the bottom gusset, folded in half to protrude into the bag, and having the same folding dimension as that of the bottom gusset, and an isosceles right triangle pocket provided at a portion in which the bottom gusset and each of the side portion gussets overlap. According to the technology described in Patent Literature 1, since both the bag front portion and the bag rear portion can form a three-way gusset bag without being bent, shape retention and self-standing properties can be satisfied.

RELATED ART DOCUMENTS

Patent Documents

Patent Document 1

Japanese Unexamined Patent Application, First Publication No. 2002-332049

SUMMARY OF INVENTION

Technical Problem

However, in the technology described in Patent Literature 1, when the pocket of the isosceles right triangle is formed at a portion in which the bottom gusset and the side portion gusset overlap, the pocket may not form an isosceles right triangle as designed, and the open state shape of the rectangular-bottomed packaging bag tends to be distorted. Therefore, the quality of external appearance and a self-standing properties of the rectangular-bottomed packaging bag may disimprove.

Also, in the technology described in Patent Literature 1, in the side portion gusset, a side seal in which both end edges of the bag front portion and the bag rear portion are joined in an edge joint shape protrudes outward from the bag.

Therefore, the appearance of the rectangular-bottomed packaging bag may be obstructed.

Therefore, the present invention provides a rectangular-bottomed packaging bag in which the quality of external appearance and a self-standing properties are improved compared to the conventional technology, along with a method for manufacturing the rectangular-bottomed packaging bag.

Solution to Problem

A first aspect of the present invention is a rectangular-bottomed packaging bag which is formed by folding a sheet material member, and includes a rectangular shaped bottom, a front and a rear rising from two facing sides of the bottom, a pair of sides connecting the front and the rear in which the pair of sides each include a first region positioned on the front side, a second region positioned on the rear side, a side joining portion joining the first region and the second region, and an inclined joining portion inclined to the bottom side from the side joining portion toward one of the front and the rear, and joining the sheet material member of the first region and the second region overlapping each other in a direction of thickness.

A second aspect of the present invention is a rectangular-bottomed packaging bag, as in the first aspect, may further include a bottom joining portion provided between the bottom and each of the front, the rear, and the sides, in which an end portion of the inclined joining portion positioned on the bottom side may be connected to the bottom joining portions.

A third aspect of the present invention is a rectangular-bottomed packaging bag, as in the first or second aspects, that may further include a fixed sealing portion which joins the side joining portion and the side.

A fourth aspect of the present invention is a rectangular-bottomed packaging bag, as in the third aspect, where the fixed sealing portion may be provided at an end portion of the side joining portion positioned on the bottom side.

A fifth aspect of the present invention is a rectangular-bottomed packaging bag, as in any one of the first to fourth aspects, where the bottom may include a half-folded bottom gusset which protrudes into the bag between the front and the rear, and the side may include a half-folded side portion gusset which protrudes into the bag between the front and the rear.

A sixth aspect of the present invention is a rectangular-bottomed packaging bag, as in any one of the first to fifth aspects, where a spout may be provided at an opening of the rectangular-bottomed packaging bag.

A seventh aspect of the present invention is a rectangular-bottomed packaging bag, as in any one of the first to fifth aspects, where a zipper may be provided at an opening of the rectangular-bottomed packaging bag.

An eighth aspect of the present invention is a rectangular-bottomed packaging bag, as in any one of the first to seventh aspects, where a pillar seal portion in which a part of the sheet material member is fused at a constant width and may be provided at a boundary portion including each of boundary lines which are boundaries between the front and the rear, and the pair of sides.

A ninth aspect of the present invention is a rectangular-bottomed packaging bag, as in any one of the first to fifth aspects, where a pillar seal portion in which a part of the sheet material member is fused at a constant width and may be provided at a boundary portion including each of boundary lines which are boundaries between the front and the rear, and the pair of sides, a zipper may be provided at an opening of the rectangular-bottomed packaging bag, and the pillar seal portion may be provided below the zipper.

A tenth aspect of the present invention is a method for manufacturing the rectangular-bottomed packaging bag as described in the fifth aspect of the rectangular-bottom packaging bag, and includes an unfolding step of unfolding a flat bag so that the front, the rear, and the pair of sides are formed from a pair of flat portions, the bottom is formed by opening the bottom gusset folded in half, and an isosceles-triangle-shaped folded portion is formed along the inclined joining portion by separating the pair of flat portions of the flat bag including the half-folded bottom gusset provided between the pair of flat portions, the side joining portion in which both end edges of the pair of flat portions are joined, the bottom joining portion in which the pair of flat portions and a circumferential edge portion forming a boundary with the bottom gusset are joined, and the inclined joining portion connecting obliquely between the side joining portion and the bottom joining portion, and a folding step of forming the bottom gusset again and forming the side portion gusset by bringing the front and the rear into close contact with each other while thrusting a pair of side portion folding plates facing the pair of sides and a bottom portion folding plate facing the bottom from an outer side of the bag toward an inner side of the bag after the unfolding step.

An eleventh aspect of the present invention may further include a fixed sealing step of joining the bottom joining portion formed in one of the first region and the second region, as in the tenth aspect, and the side joining portion in a state in which the side joining portion is sandwiched between the first region and the second region on an inner side of the side portion gusset after the folding step.

Effect of the Invention

According to the present invention, it is possible to provide a rectangular-bottomed packaging bag in which the external appearance quality and a self-standing properties are improved compared to the conventional technology, along with a method for manufacturing the said rectangular-bottomed packaging bag.

DESCRIPTION OF EMBODIMENTS

The present embodiment of the present invention is described with reference to the drawings. In the following description, components having the same or similar functions are denoted using the same reference symbols. Duplicate descriptions of components may also be omitted.

(Rectangular-Bottomed Packaging Bag)

Figure 1:
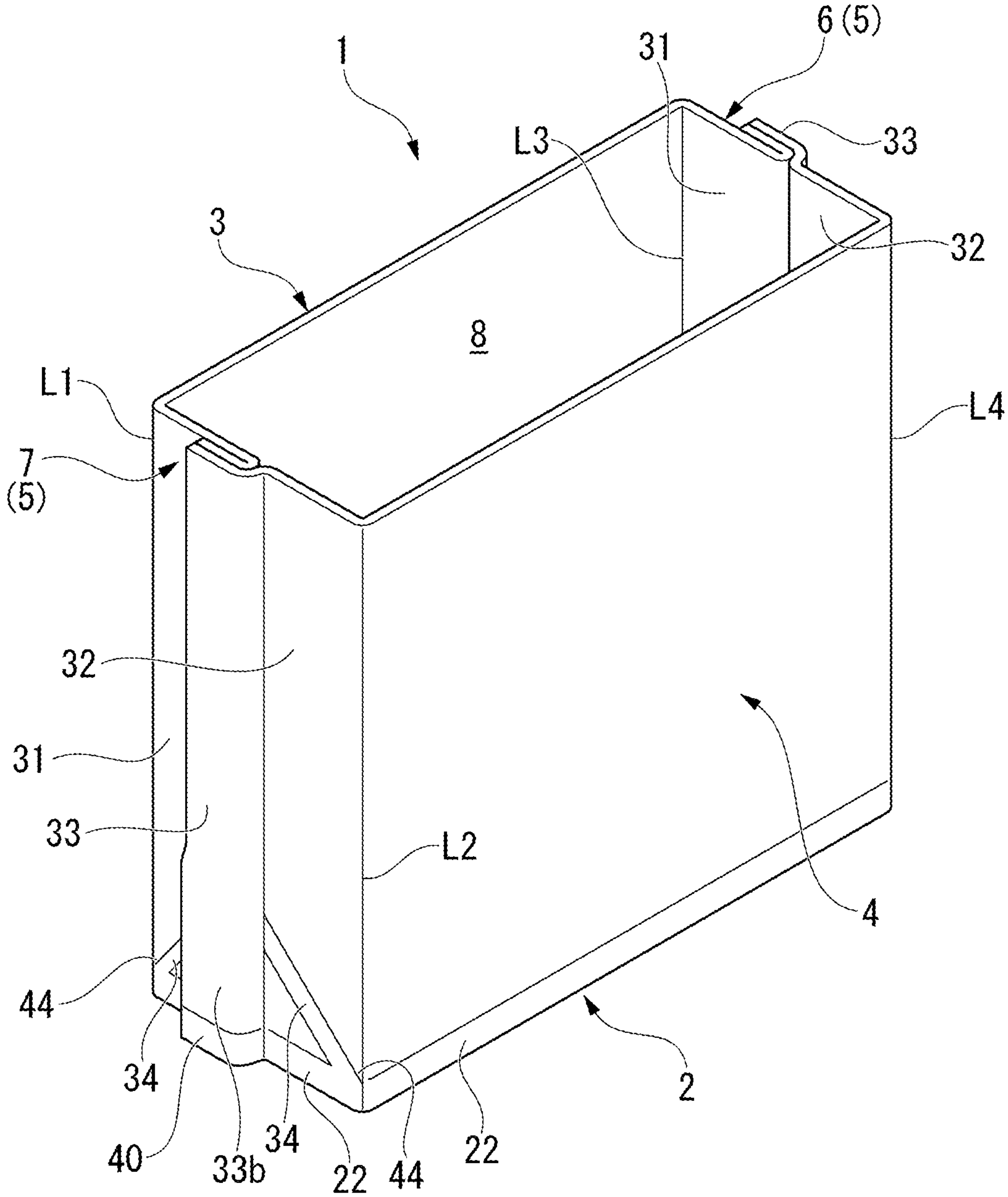
FIG. 1 is an external perspective view of a rectangular-bottomed packaging bag according to the present embodiment.
Figure 2:
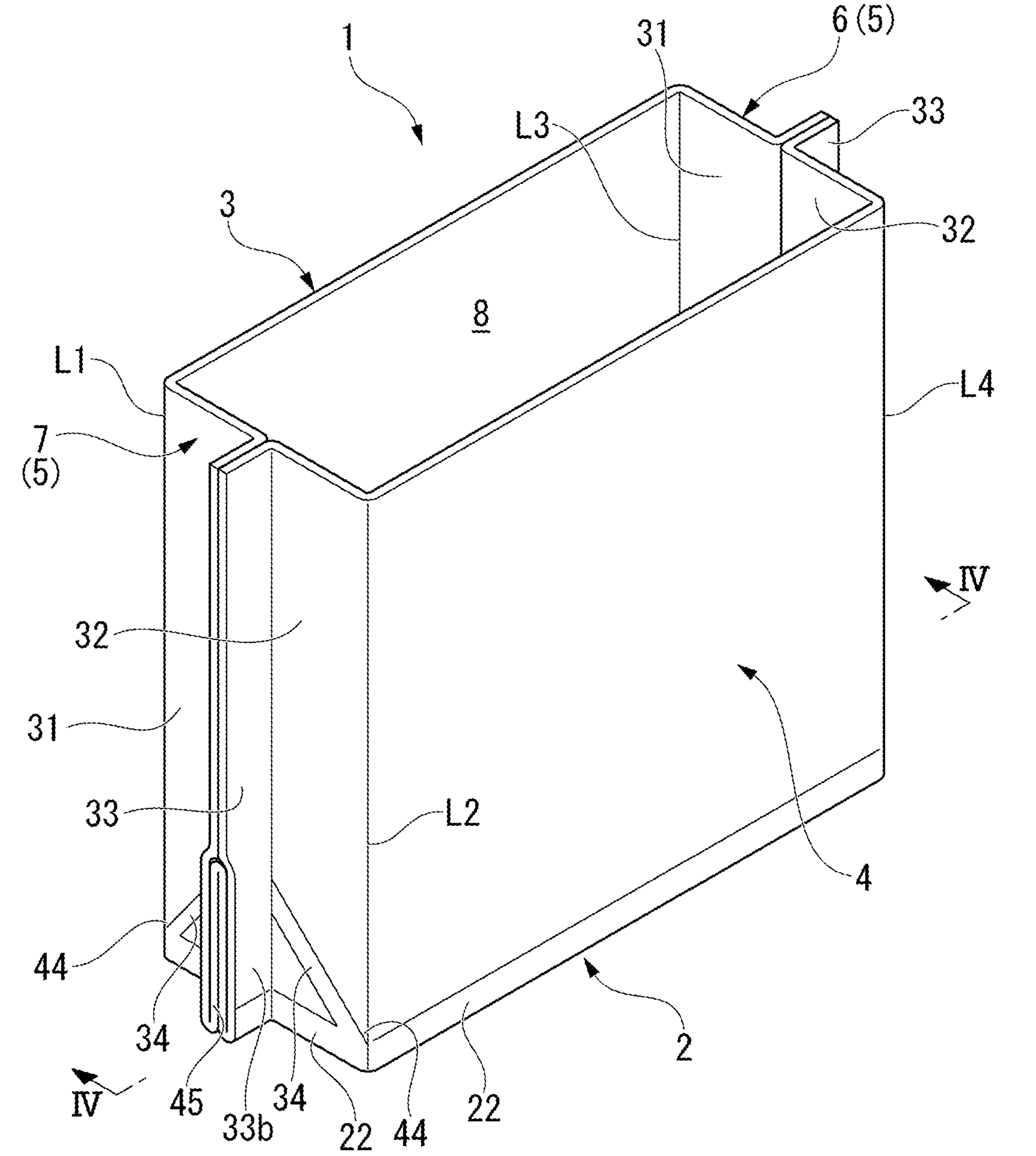
FIG. 2 is an external perspective view of the rectangular-bottomed packaging bag according to the present embodiment, in a state before a side joining portion is fixed by a fixed sealing portion.
Figure 3:
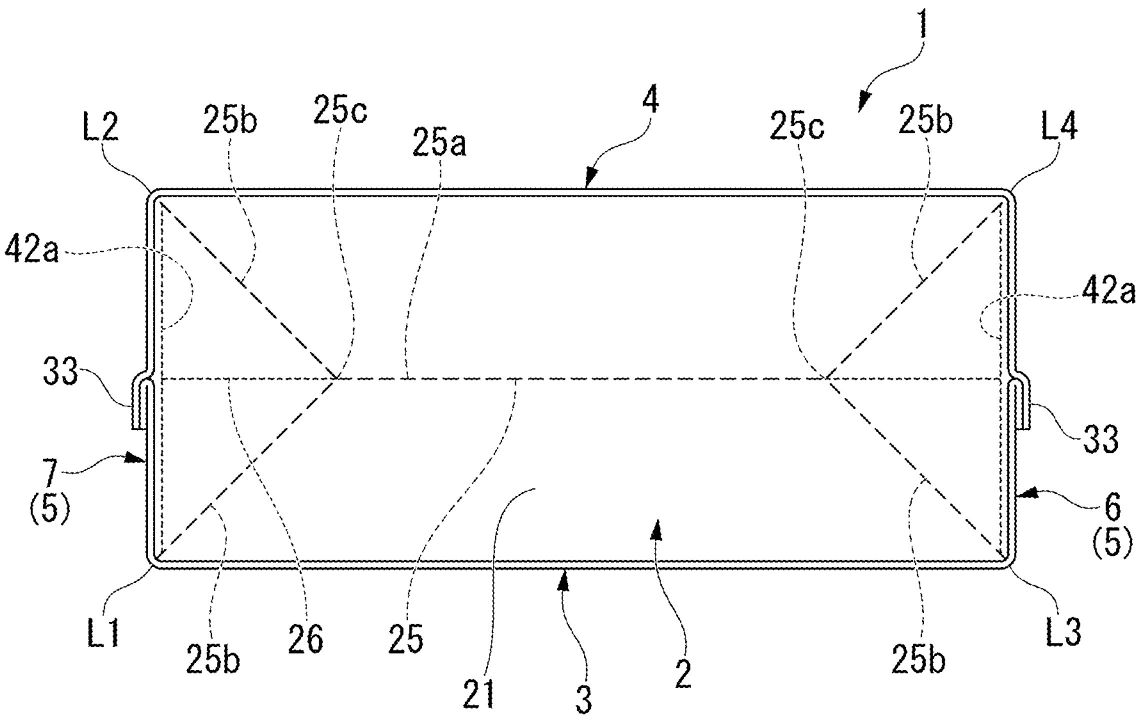
FIG. 3 is a bottom view of the rectangular-bottomed packaging bag according to the present embodiment.
Figure 4:
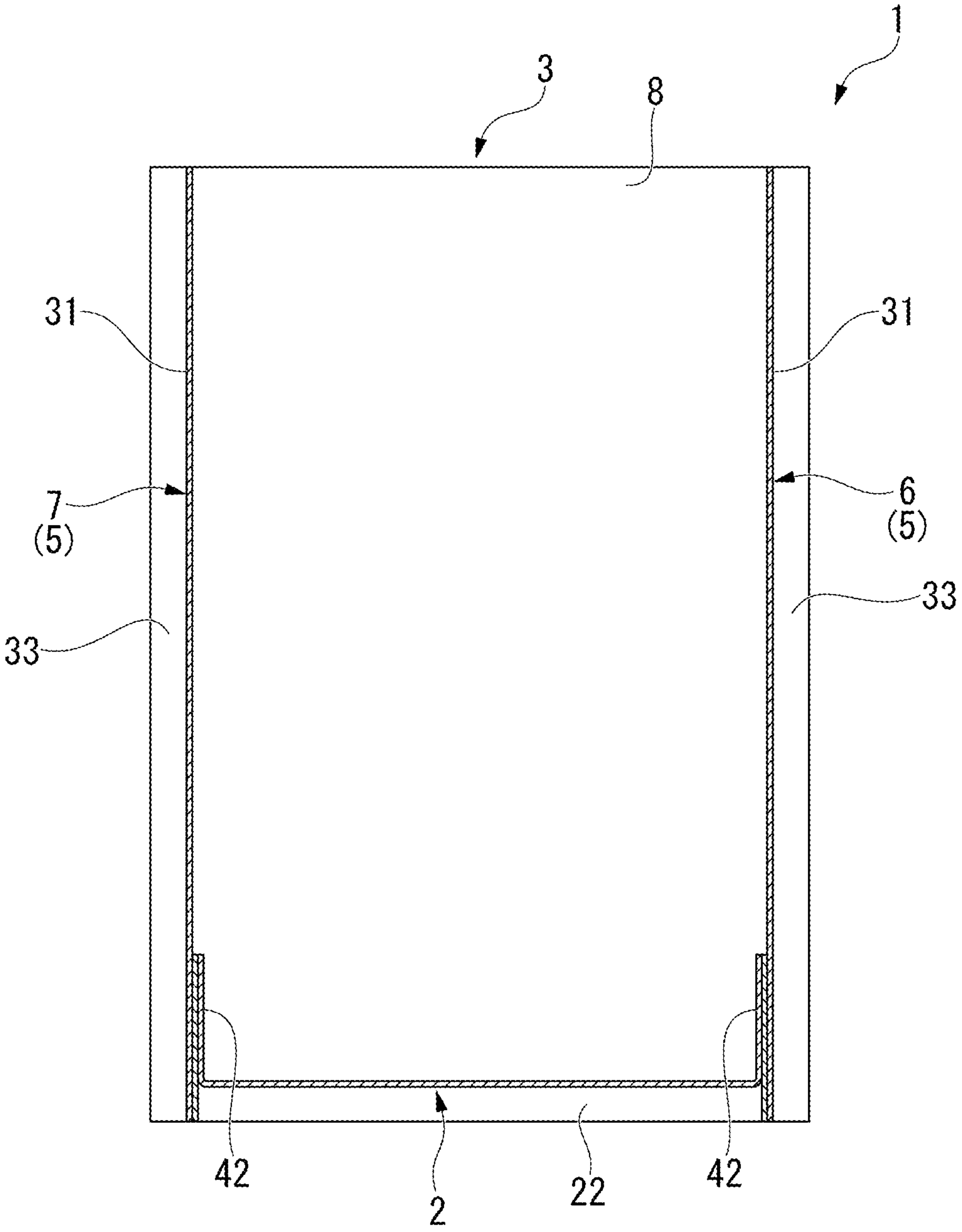
FIG. 4 is a cross-sectional view along line IV-IV of FIG. 2.

FIG. 1 is an external perspective view of a rectangular-bottomed packaging bag 1 according to the present embodiment. FIG. 2 is an external perspective view of the rectangular-bottomed packaging bag 1 according to the present embodiment in a state before a side joining portion 33 is fixed by fixed sealing portion 40. FIG. 3 is a bottom view of the rectangular-bottomed packaging bag 1 according to the present embodiment. FIG. 4 is a cross-sectional view along line Iv-Iv of FIG. 2.

As illustrated in FIGS. 1 and 2, the rectangular-bottomed packaging bag 1 is formed in a bag shape by folding a single sheet material member. The sheet material member is a laminate formed of at least a base material layer and a heat fusion layer. The base material layer forms the outermost layer of the rectangular-bottomed packaging bag 1, and the heat fusion layer forms the innermost layer of the rectangular-bottomed packaging bag 1. The base material layer is formed from a bi-axially oriented film or a uniaxially oriented film such as polyethylene terephthalate, polypropylene, and polyamide, which are excellent in printability and strength. The heat fusion layer is formed from unstretched film, a layer-shaped resin, or the like of a polypropylene-based resin, or a polyethylene-based resin such as low-density polyethylene, linear low-density polyethylene, or the like. Further, the above-described film exemplified as the base material layer, a vapor deposited film on which a metal such as aluminum or a metal oxide such as aluminum oxide or silicon oxide is vapor-deposited, or a metal foil may be used as an intermediate layer that exhibits a gas barrier function for blocking oxygen and water vapor. These layers are laminated using a known method such as a dry lamination method, an extrusion lamination method, or the like to form a laminate.

The rectangular-bottomed packaging bag 1 includes a bottom 2, a front 3, a rear 4, and a pair of sides 5. The bottom 2 is formed in a rectangular shape (quadrangular shape). The front 3 and the rear 4 rise upward from two long sides of the bottom 2 and are disposed to face each other with the bottom 2 interposed therebetween. The front 3 and the rear 4 are formed in rectangular shapes. The pair of sides 5 rise upward from two short sides of the bottom 2 and connect the front 3 and the rear 4. One of the pair of sides 5 is a right side 6. The other of the pair of sides 5 is a left side 7. An opening 8 that acts as a passage between the inside and outside of the rectangular-bottomed packaging bag 1 is provided at end portions (upper end portions) of the front 3, the rear 4, and the pair of sides 5 on a side opposite to the bottom 2.

Hereinafter, a left-right direction indicates a direction in a front view with respect to the rear 4. Also, in the following description, a direction in which the front 3 and the rear 4 face each other may be referred to as a front-rear direction. Also, in the following description, a direction in which the pair of sides 5 face each other may be referred to as the left-right direction. Also, a direction perpendicular to both the front-rear direction and the left-right direction may be referred to as an upright direction. Also, in the upright direction, a side on which the bottom 2 is positioned may be referred to as a lower side, and a side opposite thereto may be referred to as an upper side.

(Bottom)

As illustrated in FIG. 3, the bottom 2 has a bottom gusset 21. The bottom gusset 21 is bent to protrude into the bag in a state in which the rectangular-bottomed packaging bag 1 is closed. The bottom gusset 21 includes a valley fold portion 25 that is bent to protrude into the bag, and a mountain fold portion 26 that is bent to protrude outward from the bag. The valley fold portion 25 is formed to include a straight portion 25*a* that is parallel to the front 3 and the rear 4 and terminates inside a circumferential edge portion of the bottom 2 at an intermediate portion (intermediate portion in the front-rear direction) between the front 3 and the rear 4, and a V-shaped portion 25*b* extending from both end portions 25*c* of the straight portion 25*a* toward corresponding (adjacent) corner portions of the bottom 2. The mountain fold portion 26 extends in a direction for the most part perpendicular to the short sides of the bottom 2 from both end portions 25*c* of the straight portion 25*a* in the valley fold portion 25. When the bottom gusset 21 is bent to protrude into the bag, the bottom 2 is folded so that the front 3 and the rear 4 are close to each other.

As illustrated in FIG. 1, a bottom joining portion 22 extending on the same surface as the front 3, the rear 4, the right side 6, and the left side 7 is provided on a lower end side of each of the front 3, the rear 4, the right side 6, and the left side 7, and a lower outer side (lower side) of four sides of the bottom 2. Specifically, the bottom joining portion 22 is provided by being formed of a sheet material member between the bottom 2 and the front 3, between the bottom 2 and the rear 4, between the bottom 2 and the right side 6, and between the bottom 2 and the left side 7.

The bottom joining portion 22 is formed on the circumferential edge of the bottom 2 at a lower end of the rectangular-bottomed packaging bag 1. The bottom joining portion 22 extends from the lower ends of the front 3, the rear 4, the left side 7, and the right side 6 on the same surface as each of these surfaces with a constant width, and is provided on the entire circumference of the rectangular-bottomed packaging bag 1. As illustrated in FIG. 4, the bottom joining portion 22 protrudes downward from the surface of bottom 2. Thereby, the rectangular-bottomed packaging bag 1 stands on its own with the bottom joining portion 22 acting as footing thereof.

The front 3 and the rear 4 are connected to an inner edge (upper edge) of the bottom joining portion 22, and the inner edge of the bottom joining portion 22 coincides with the long side of the bottom 2. Therefore, the front 3 and the rear 4 are connected to the bottom 2 via the bottom joining portion 22. On the other hand, the side 5 is connected to an inner edge of the bottom joining portion 22, and the bottom joining portion 22 is provided on an outer side (lower side) of the short side of the bottom 2. Specifically, the bottom joining portion 22 connected to the side 5 and the side 5 are connected to each other with a folded portion 42, to be described in detail later, positioned on a back side of the side 5 interposed therebetween.

(Sides)

As illustrated in FIG. 1, the pair of sides 5 including the right side 6 and the left side 7 are formed each in a rectangular shape that is long in the upright direction along a rising direction from the bottom 2. Since configurations of the right side 6 and the left side 7 are the same, in the following description, the left side 7 is described, and description of the right side 6 may be omitted. Also, the left side 7 may be simply referred to as "the side 5".

The side 5 includes a first region 31, a second region 32, the side joining portion 33, and an inclined joining portion 34.

The first region 31 is provided on the front 3 side of the side 5 from an intermediate portion (intermediate portion in the front-rear direction) between the front 3 and the rear 4. The first region 31 of the left side 7 is one region of the rectangular side 5 where rectangular region 5 is split into two regions in the transverse direction (front-rear direction). An end portion of the first region 31 positioned on the front 3 side is connected to a left side of the front 3. That is, the front 3 and the first region 31 are continuously formed by the sheet material member bent at a first boundary line L1 extending in the upright direction along the left side of the front 3.

The second region 32 is provided on the rear 4 side of the side 5 from the intermediate portion between the front 3 and the rear 4. The second region 32 of the left side 7 is the other region of the rectangular side 5 divided into two in the transverse direction (front-rear direction). An end portion of the second region 32 positioned on the rear 4 side is connected to a left side of the rear 4. That is, the rear 4 and the second region 32 are continuously formed by bending the sheet material member at a second boundary line L2 extending in the upright direction along the left side of the rear 4.

Similarly, on the right side 6, the front 3 and the first region 31 of right side 6 are continuous through the sheet material member bent at a third boundary line L3 along a right side of the front 3. Also, the rear 4 and the second region 32 of the right side 6 are continuous through the sheet material member bent at a fourth boundary line L4 along a right side of the rear 4.

As illustrated in FIGS. 1 and 2, the side joining portion 33 is provided between the first region 31 and the second region 32. The side joining portion 33 joins an inner surface of the sheet material member continuous with the first region 31 and an inner surface of the sheet material member continuous with the second region 32 at a constant width. In other words, the first region 31 is joined to the second region 32 via the side joining portion 33. The side joining portion 33 is formed so that it protrudes outward from the bag from the first region 31 and the second region 32 as illustrated in FIG. 2, and then is bent towards the front 3 side along a ridge line whose base end portion positioned on an inner side of the bag in a protruding direction with respect to the side 5 extending in the upright direction. That is, the side joining portion 33 is formed so as to protrude outward from the bag, and then is bent towards the front 3 side along a fold line with the base end portion which is an end portion of the side joining portion 33 on an inner side of the bag as the fold line extending in the upright direction. Thereby, the side joining portion 33 is for the most part disposed parallel to the first region 31.

As described above, the end portion of the first region 31 on the rear 4 side and the end portion of the second region 32 on the front 3 side are integrally joined by the side joining portion 33 extending at a central portion of the side 5 in the width direction (front-rear direction). Thereby, the first region 31 and the second region 32 are integrated to form the side 5.

As illustrated in FIG. 1, the rectangular-bottomed packaging bag 1 of the present embodiment includes the fixed sealing portion 40 which joins the side joining portion 33 and the side 5. The fixed sealing portion 40 joins the side joining portion 33, which is folded towards the front 3 side and is for the most part disposed parallel to the first region 31, and the first region 31. In the present embodiment, the fixed sealing portion 40 joins the side joining portion 33 and the side 5 (first region 31) at a lower end portion 33*b* of the side joining portion 33 positioned on the bottom 2 side. More specifically, the fixed sealing portion 40 joins the lower end portion 33*b* of the side joining portion 33, that is, the portion of the bottom joining portion 22 in the side joining portion 33, and the portion of the bottom joining portion 22 provided in the first region 31 of the side 5. In other words, the side joining portion 33 is fixed by being joined to the side 5 (first region 31) in the bottom joining portion 22. Joining of the fixed sealing portion 40 is joining between the base material layers constituting the outermost layers of the sheet material member. The fixed sealing portion 40 is formed by joining via heat fusion, after the base material of the fixed sealing portion 40 is coated with a heat-fusible resin using a heat-fusible film for the base material layer of the fixed sealing portion 40, or joining via an adhesive, joining via an ultrasonic seal, or the like.

The inclined joining portion 34 is provided in each of the first region 31 and the second region 32. The inclined joining portion 34 joins the sheet material member of the first region 31 and the second region 32 overlapping each other in a thickness direction with a predetermined width. Specifically, the inclined joining portion 34 having a predetermined width joins the overlapped sheet material member of the first region 31 and the second region 32, and a folded portion 42, to be described later, positioned on the back side of the side 5. In the first region 31, the inclined joining portion 34 is inclined to gradually approach the bottom 2 side from the side joining portion 33 as the inclined joining portion 34 approaches the front 3. In the second region 32, the inclined joining portion 34 is inclined to gradually approach the bottom 2 side from the side joining portion 33 as the inclined joining portion 34 approaches the rear 4. A bottom side end portion 44 of the inclined joining portion 34 positioned on the bottom 2 side is connected to the bottom joining portion 22. An end portion of the inclined joining portion 34 on the side joining portion 33 side is described later. In the present embodiment, the side joining portion 33, the bottom joining portion 22, and the inclined joining portion 34 form an isosceles right triangle shape with the inclined joining portion 34 as the hypotenuse. That is, the inclined joining portion 34 forms an isosceles right triangular shape together with a part of the side joining portion 33 and a part of the bottom joining portion 22 with the inclined joining portion 34 as the hypotenuse.

The bottom side end portion 44 in which an outer side corresponding to the upper side in the upright direction of the inclined joining portion 34 formed with a constant width intersects the bottom joining portion 22 serves as a base point of each of the four sides of the rectangular-bottomed packaging bag 1.

Specifically, the bottom side end portion 44 on the outer side of the inclined joining portion 34 provided in the first region 31 of the left side 7 is the base point of the first boundary line L1. The bottom side end portion 44 on the outer side of the inclined joining portion 34 provided in the second region 32 of the left side 7 is the base point of the second boundary line L2. The bottom side end portion 44 on the outer side of the inclined joining portion 34 provided in the first region 31 of the right side 6 is the base point of the third boundary line L3. The bottom side end portion 44 on the outer side of the inclined joining portion 34 provided in the second region 32 of the right side 6 is the base point of the fourth boundary line L4.

These bottom side end portions 44 of the inclined joining portions 34 coincide with four corner portions of the bottom 2, respectively.

That is, the inclined joining portion 34 positions the corner portions of the bottom 2 by the bottom side end portions 44. Further, the positioned corner portions of the bottom 2, that is, the bottom side end portions 44 of the inclined joining portions 34, respectively position the boundary lines L1, L2, L3, and L4 between the front 3, the rear 4, and the sides 5.

Figure 5:
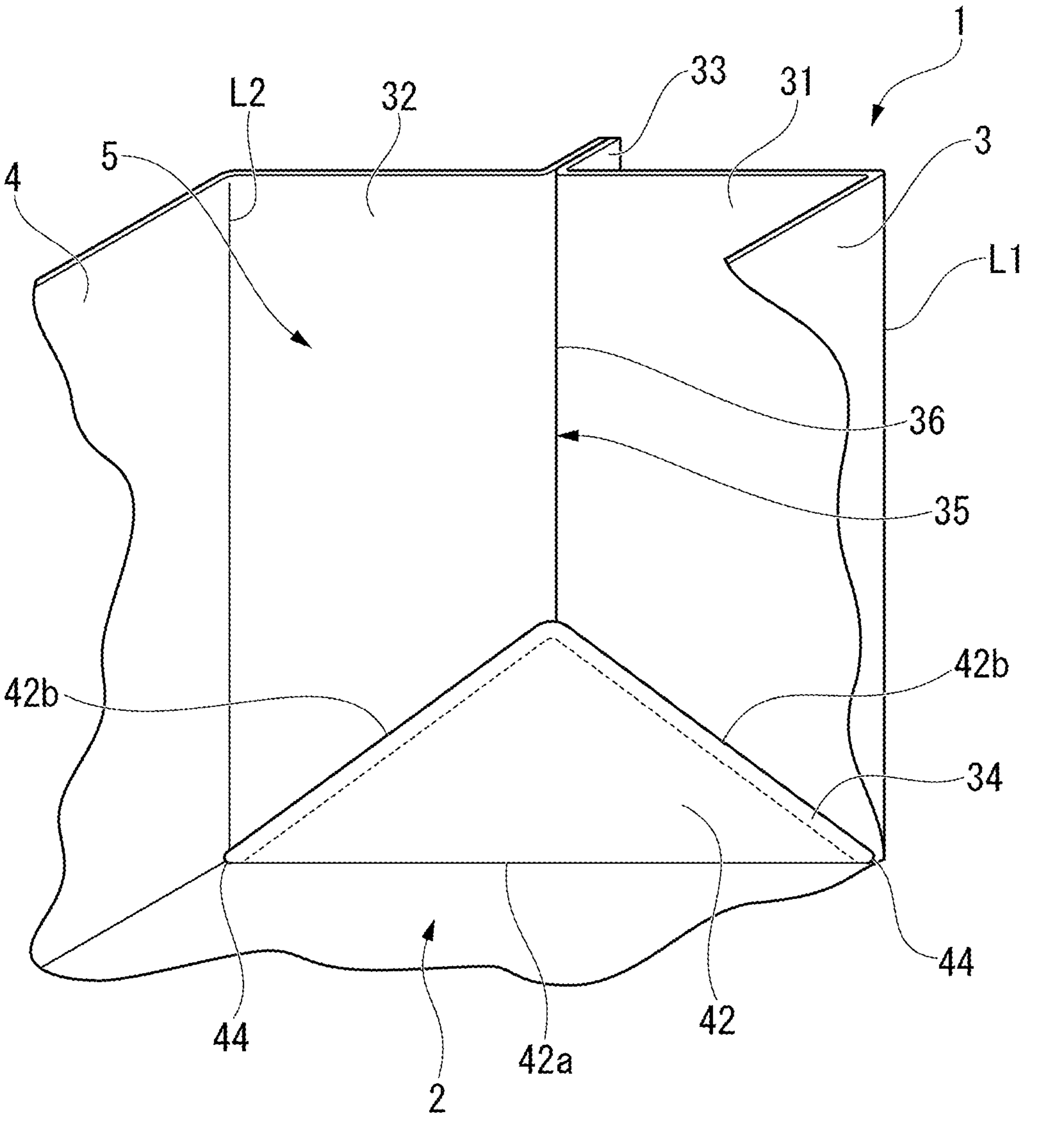
FIG. 5 is a partial perspective view illustrating the inside of the rectangular-bottomed packaging bag according to the present embodiment.

FIG. 5 is a partial perspective view illustrating the inside of the rectangular-bottomed packaging bag 1 according to the present embodiment.

The isosceles triangle-shaped folded portion 42 is formed on an inner side of each side 5 (only the left side 7 side is illustrated in FIG. 5). The folded portion 42 is continuous with the bottom 2. The folded portion 42 has an isosceles right triangle shape whose hypotenuse, 42*a*, has a side overlapping the short side of the bottom 2 when viewed from the inside of the rectangular-bottomed packaging bag 1. Two equal sides 42*b* of the folded portion 42 are provided on the back side of the side 5. The isosceles triangle shape of the folded portion 42 has a point that overlaps the side joining portion 33 (the base end portion of the side joining portion 33) as an apex, and the two equal sides 42*b* are inclined to the bottom 2 side toward the front 3 and the rear 4, respectively, from the apex. The two equal sides 42*b* of the folded portion 42 coincide with the outer sides of the inclined joining portion 34. That is, the inclined joining portion 34 also has a function of positioning the folded portion 42 by positioning the two equal sides 42*b* of the folded portion 42.

A perpendicular line from the apex of the isosceles triangle of the folded portion 42 to the hypotenuse 42*a*, half of the hypotenuse 42*a* from the perpendicular line to the corner portion of the bottom 2, and one of the equal sides 42*b* form an isosceles right triangle shape with the side angle 42*b* as a hypotenuse. That is, a length of the perpendicular line and a length of half of the hypotenuse 42*a* forming the folded portion 42 are the same. This is because folding widths of the bottom gusset 21 of the bottom 2 and a side portion gusset 35 of the side 5 are the same. Also, the vertical line overlaps the side joining portion 33.

On the side 5 on a back side of the folded portion 42, at a position corresponding (adjacent in the left-right direction) to a perpendicular line drawn from the apex of a triangular shape of the folded portion 42 to the hypotenuse 42*a*, a sandwiched portion 45 (see FIG. 2) continuous with the folded portion 42 at the apex is provided. The sandwiched portion 45 is sandwiched by the side joining portion 33. When the sandwiched portion 45 is sandwiched by the side joining portion 33, the apex of the folded portion 42 is connected to the side 5.

Specifically, the sandwiched portion 45 is provided on a lower side (a portion close to the lower side) of the side joining portion 33. The sandwiched portion 45 is formed by a part of the sheet material member constituting the bottom gusset 21 entering the inside of the side joining portion 33. That is, the sandwiched portion 45 is formed by a part of the sheet material member constituting the bottom gusset 21 entering between the sheet material member continuous with the first region 31 and the sheet material member continuous with the second region 32 constituting the side joining portion 33. The sandwiched portion 45 is provided between a lowermost end portion of the side joining portion 33 and a position corresponding to an end portion of the inclined joining portion 34 on the side joining portion 33 side. That is, an upper end portion of the sandwiched portion 45 and the end portion of the inclined joining portion 34 on the side joining portion 33 side coincide with each other. In the sandwiched portion 45, the base material layers constituting the outermost layers of the sheet material member constituting the bottom gusset 21 face each other. Therefore, although the base material layers normally are in an open state, since the external appearance of the rectangular-bottomed packaging bag 1 becomes satisfied and a self-standing properties also improve when the facing base material layers are joined to be in a closed state, the facing base material layers are preferably joined to be in a closed state. In order to bring the sandwiched portion 45 into a closed state, it is necessary to join the base material layers to each other. As a method of bringing the sandwiched portion 45 into a closed state, similarly to the joining of the fixed sealing portion 40, a method of joining via heat fusion, after coating the base material layer of the portion with a heat-fusible resin using a heat-fusible film for the base material layer, or joining via an adhesive, joining via an ultrasonic seal, or the like are a few examples.

As illustrated in FIG. 4, a portion in which the folded portion 42 is formed on the back side of the side 5 of the rectangular-bottomed packaging bag 1 is formed by overlapping the sheet material member into three layers in the direction of thickness of the sheet material member. Of the three layers of the sheet material member, two layers of the sheet material member positioned on an outer side of the bag (a portion on an outer side of the bag) are joined to each other by the inclined joining portion 34 (see FIG. 5). In other words, the two equal sides 42*b* of the folded portion 42 coincide with the outer side (outer vicinity) of the inclined joining portion 34, whereby the folded portion 42 and the side 5 are joined. Therefore, since a gap between the equal sides 42*b* of the folded portion 42 and the side 5 is closed, contents are prevented from entering the gap between the folded portion 42 and the side 5 when the rectangular-bottomed packaging bag 1 is filled with contents.

The pair of sides 5 each have the side portion gusset 35. The side portion gusset 35 has a fold line 36 extending in the upright direction at a central portion of the right side 6 and the left side 7 between the front 3 and the rear 4 and in a width dimension in the front-rear direction (thickness direction of the front 3 and the rear 4) of the rectangular-bottomed packaging bag 1. The side portion gusset 35 is bent to protrude into the bag along the fold line 36 with the rectangular-bottomed packaging bag 1 closed. When the side portion gusset 35 is bent, the side 5 is folded in half so that the first region 31 and the second region 32 face each other. The fold line 36 of the side portion gusset 35 coincides with the side joining portion 33.

As described above, the rectangular-bottomed packaging bag 1 is a three-way gusset bag that includes one bottom gusset 21 and two side portion gussets 35, and having the opening 8 on an upper side (upper end portion).

(Rectangular-Bottomed Packaging Bag Manufacturing Method)

Next, a method for manufacturing the above-described rectangular-bottomed packaging bag 1 is described.

Figure 6:
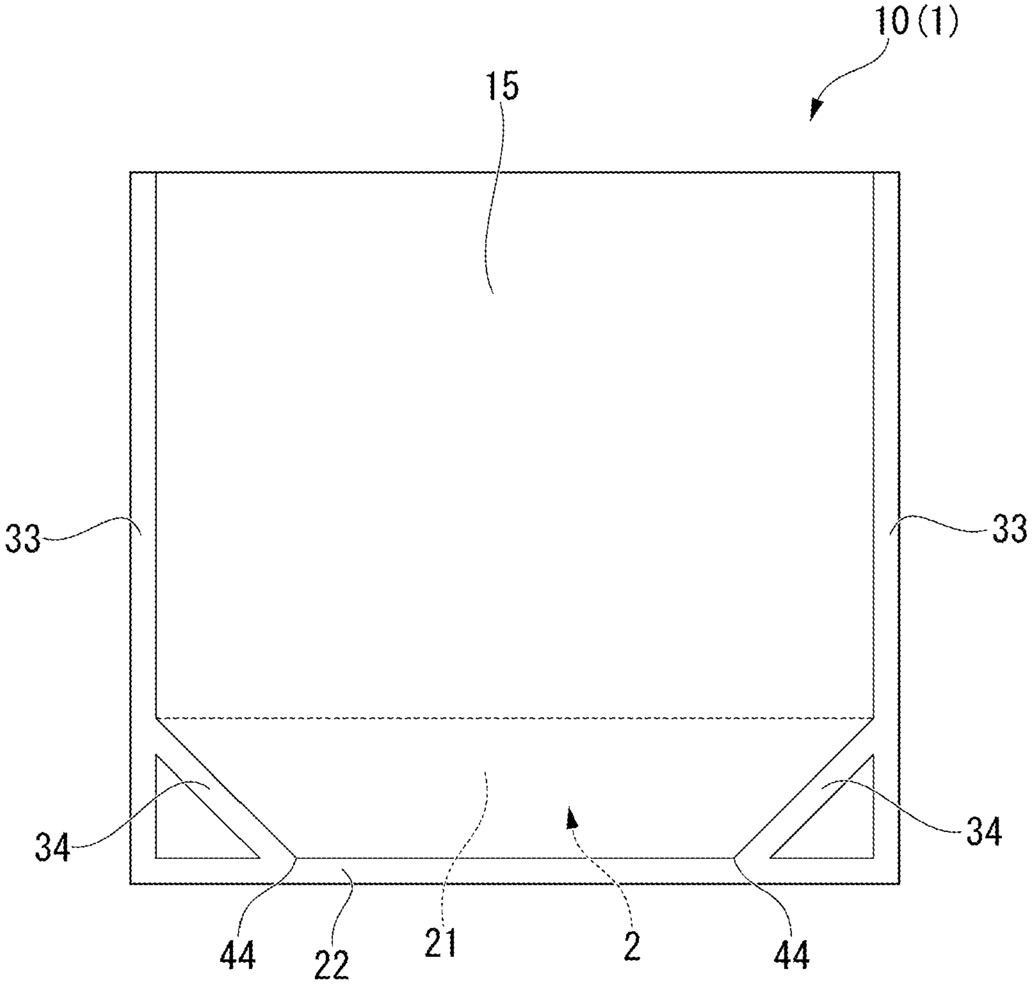
FIG. 6 is a front view of a flat bag according to the present embodiment.

FIG. 6 is a front view of a flat bag 10 according to the present embodiment.

The rectangular-bottomed packaging bag 1 is manufactured by deforming the flat bag 10 formed from a sheet material member. A method for manufacturing the rectangular-bottomed packaging bag 1 includes a method for manufacturing the rectangular-bottomed packaging bag 1 from the flat bag 10 manufactured in advance, and a case of manufacturing the rectangular-bottomed packaging bag 1 continuously or discontinuously after a step of manufacturing the flat bag 10. The method for manufacturing the rectangular-bottomed packaging bag 1 from the flat bag 10 includes an unfolding step, a folding step, and a fixed sealing step.

First, from one material sheet member, the flat bag 10 from which the rectangular-bottomed packaging bag 1 is formed. The flat bag 10 is formed by folding one sheet material member into a W shape and then joining predetermined portions. The flat bag 10 includes the bottom gusset 21, the side joining portion 33, the bottom joining portion 22, and the inclined joining portion 34 described above.

In the stage of forming the flat bag 10, the bottom gusset 21 is first formed by folding one sheet material member into a W shape. The bottom gusset 21 is formed between a pair of flat portions 15 formed by folding a sheet material member. The pair of flat portions 15 of the flat bag 10 become the front 3, the rear 4, and the pair of sides 5 of the rectangular-bottomed packaging bag 1. The bottom gusset 21 folded in half to protrude into the bag.

Next, the side joining portion 33 is formed by joining both end edges of the pair of flat portions 15 (both end edges of the flat portion 15 in the left-right direction). At a position of the side joining portion 33 overlapping the bottom gusset 21, the flat portion 15 and the bottom gusset 21 are joined. The bottom gusset 21 at this position (a part of the bottom gusset 21 joined to the flat portion 15) becomes the sandwiched portion 45.

Next, the bottom joining portion 22 is formed by joining the pair of flat portions 15 and a circumferential edge portion forming a boundary with the bottom gusset 21. Both end portions of the bottom joining portion 22 are connected to the side joining portion 33. The bottom joining portion 22 is provided on each of one and the other of the pair of flat portions 15.

Next, the inclined joining portion 34 that is connected obliquely between the side joining portion 33 and the bottom joining portion 22 is formed. The flat portion 15 and the bottom gusset 21 are joined to the inclined joining portion 34. At this time, an inclination angle of the inclined joining portion 34 with respect to the bottom joining portion 22 is about 45 degrees. An end portion of the inclined joining portion 34 on the side joining portion 33 side is provided at a position equivalent to a folded line of the half-folded bottom gusset 21 in a height direction (longitudinal direction of the side joining portion 33) of the flat bag 10.

The side joining portion 33, the bottom joining portion 22, and the inclined joining portion 34 described above are formed by fusing the heat fusion layers of the sheet material member by heat-sealing the sheet material member. Therefore, the bottom joining portion 22, the side joining portion 33, and the inclined joining portion 34 are formed.

Here, in the sandwiched portion 45, a portion in which the outermost layers of the sheet material member are joined to each other is joined by the above-described method.

Further, the order of forming the side joining portion 33, the bottom joining portion 22, and the inclined joining portion 34 is not limited to the above-described order. The side joining portion 33, the bottom joining portion 22, and the inclined joining portion 34 may be formed at the same time.

In the unfolding step, the flat bag 10 is unfolded so that the isosceles triangle-shape folded portion 42 is formed along the inclined joining portion 34 by separating the pair of flat portions 15 of the flat bag 10. The unfolding step includes a plate insertion step and a plate separation step.

Figure 7:
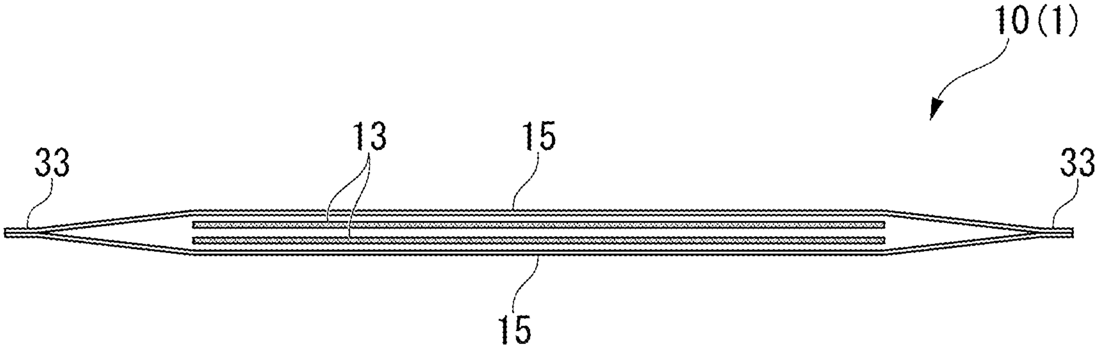
FIG. 7 is an explanatory view illustrating a plate insertion step according to the present embodiment.
Figure 8:
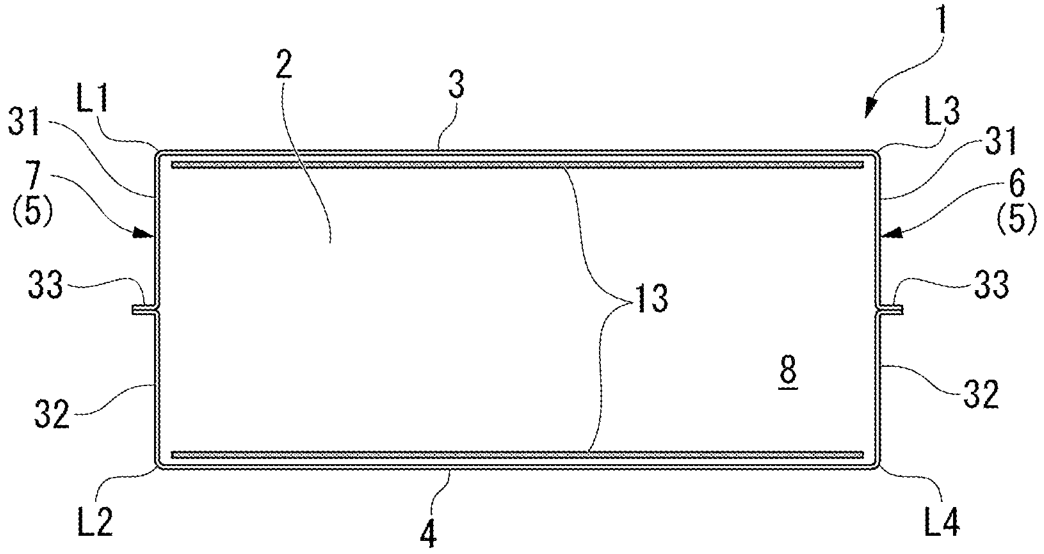
FIG. 8 is an explanatory view illustrating a plate separation step according to the present embodiment.

FIG. 7 is an explanatory view illustrating the plate insertion step according to the present embodiment. FIG. 8 is an explanatory view illustrating the plate separation step according to the present embodiment.

As illustrated in FIG. 7, in the plate insertion step, a pair of unfolding plates 13 that is openable and closable are inserted into the inside of the flat bag 10 from the opening 8 of the flat bag 10 with the pair of unfolding plates 13 close to each other. Alternatively, the pair of unfolding plates 13 are inserted into the inside of the flat bag 10 from the opening 8 of the flat bag by moving the flat bag 10 to cover the pair of unfolding plates 13. The pair of unfolding plates 13 are disposed to face each other in a thickness direction of the flat bag 10. The pair of unfolding plates 13 are formed to have the same shape. A width dimension of the unfolding plate 13 in the left-right direction (left-right direction of the flat portion 15) is the same as a dimension between the bottom side end portions 44 (see FIG. 6) of the pair of inclined joining portions 34 formed at both end portions of the bottom joining portion 22.

As illustrated in FIG. 8, in the plate separation step, the pair of unfolding plates 13 inserted inside the flat bag 10 are separated from each other in the thickness direction of the flat bag 10. Therefore, the front 3, the rear 4, and the pair of sides 5 are formed from the pair of flat portions 15, the bottom 2 is formed when the bottom gusset 21 folded in half opens, and the rectangular-bottomed packaging bag 1 is formed from the flat bag 10. Specifically, when the pair of flat portions 15 are bent at positions corresponding to (adjoining) left and right end portions of the pair of unfolding plates 13, the first boundary line L1, the second boundary line L2, the third boundary line L3, and the fourth boundary line L4 are formed on the pair of flat portions 15. A portion in contact with one of the pair of unfolding plates 13 is the front 3, and a portion in contact with the other of the pair of unfolding plates 13 is the rear 4. A portion positioned between the pair of separated unfolding plates 13 and coming closer to and facing each other according to a separation operation of the unfolding plates 13 is the pair of sides 5. Further, when the long sides of the bottom 2 are positioned by the pair of separated unfolding plates 13, the rectangular bottom 2 is formed on a side opposite to the opening 8. Also, the isosceles triangle-shaped fold portion 42 is formed along the inclined joining portion 34 according to the separation operation of the unfolding plate 13. At this stage, the flat bag 10 is the rectangular-bottomed packaging bag 1 in an unfolded state.

Figure 9:
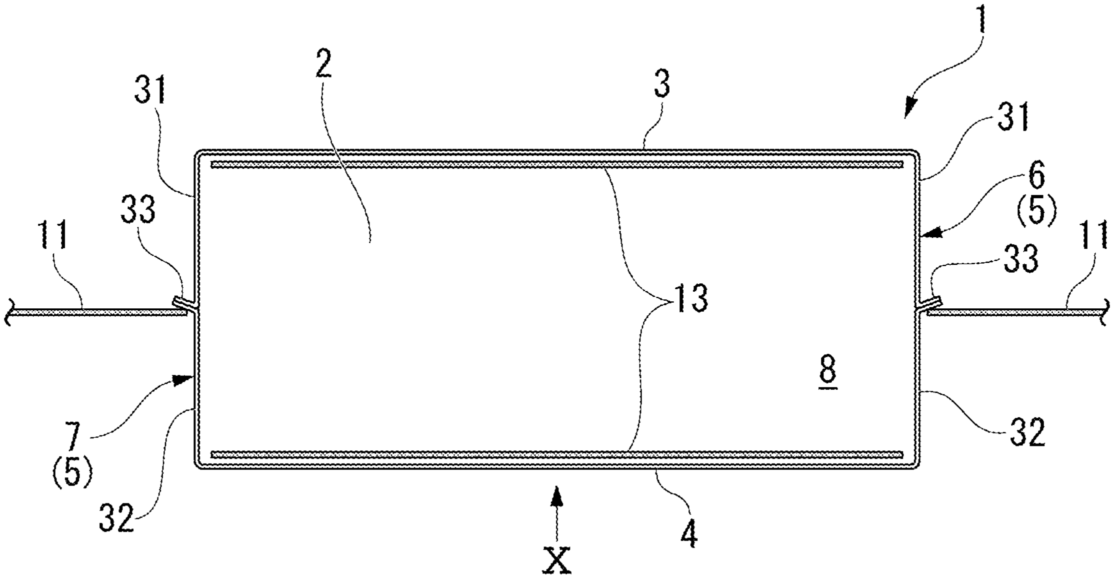
FIG. 9 is an explanatory view illustrating a folding start state in a folding step according to the present embodiment.
Figure 10:
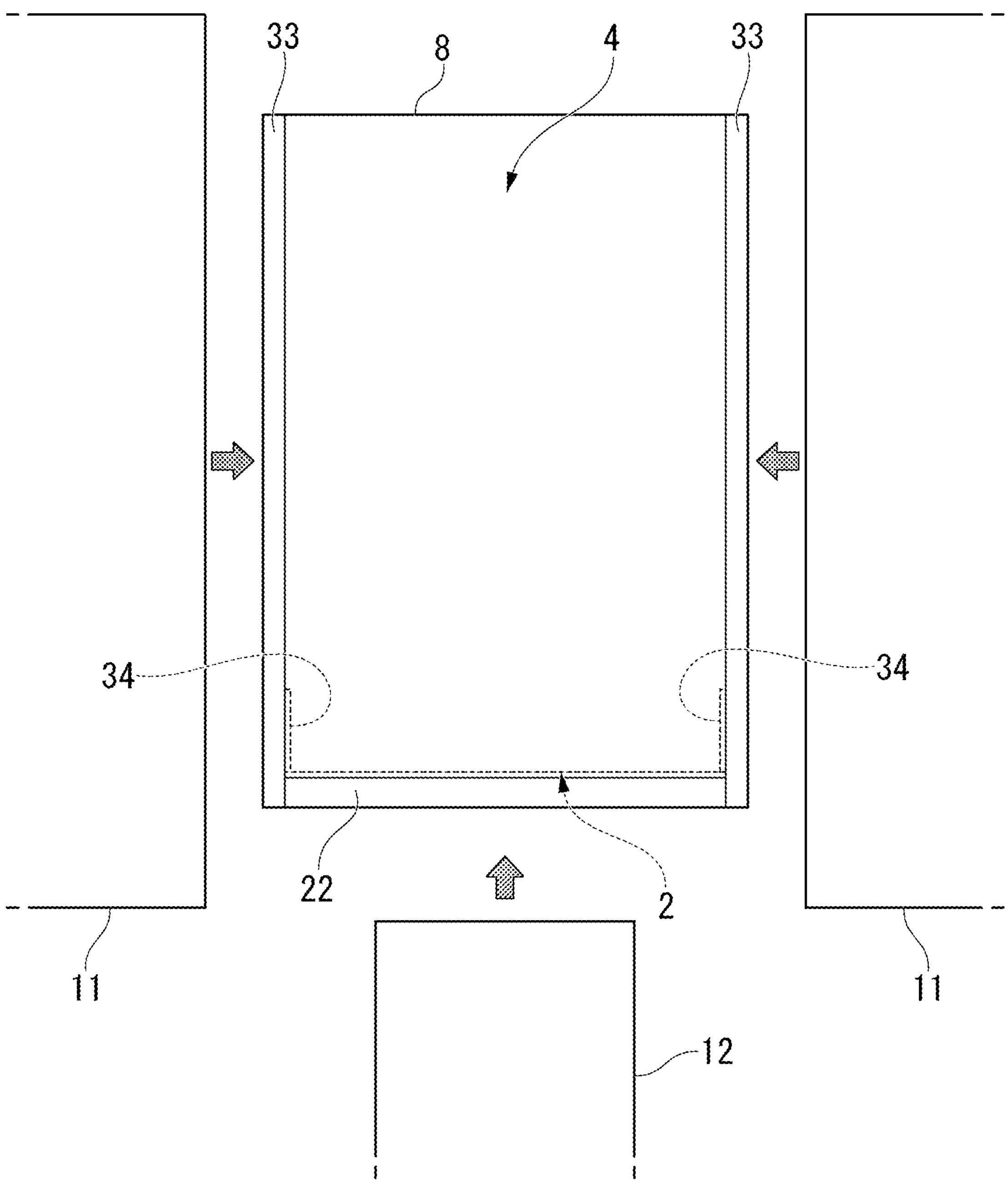
FIG. 10 is a view in a direction of arrow X in FIG. 9.
Figure 11:
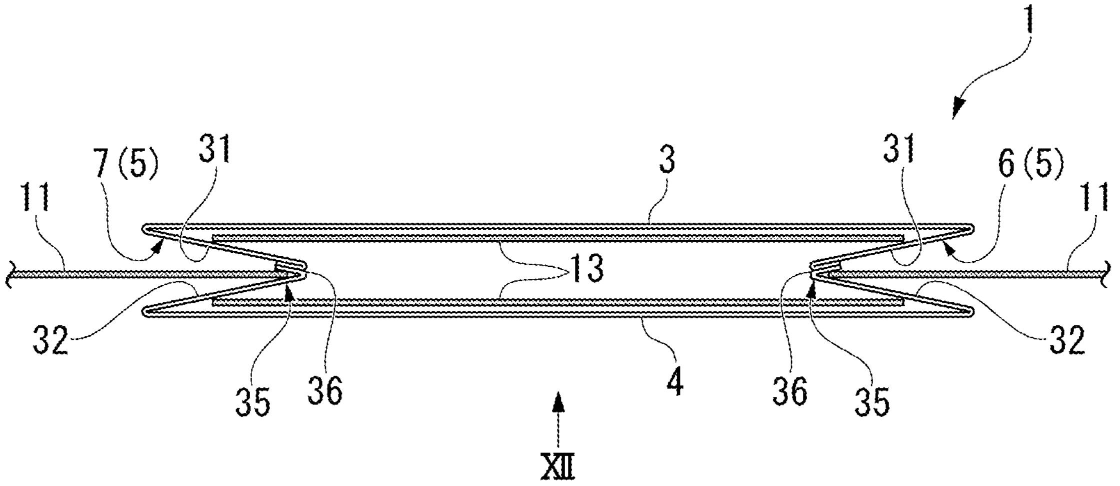
FIG. 11 is an explanatory view illustrating a folding end state in the folding step according to the present embodiment.
Figure 12:
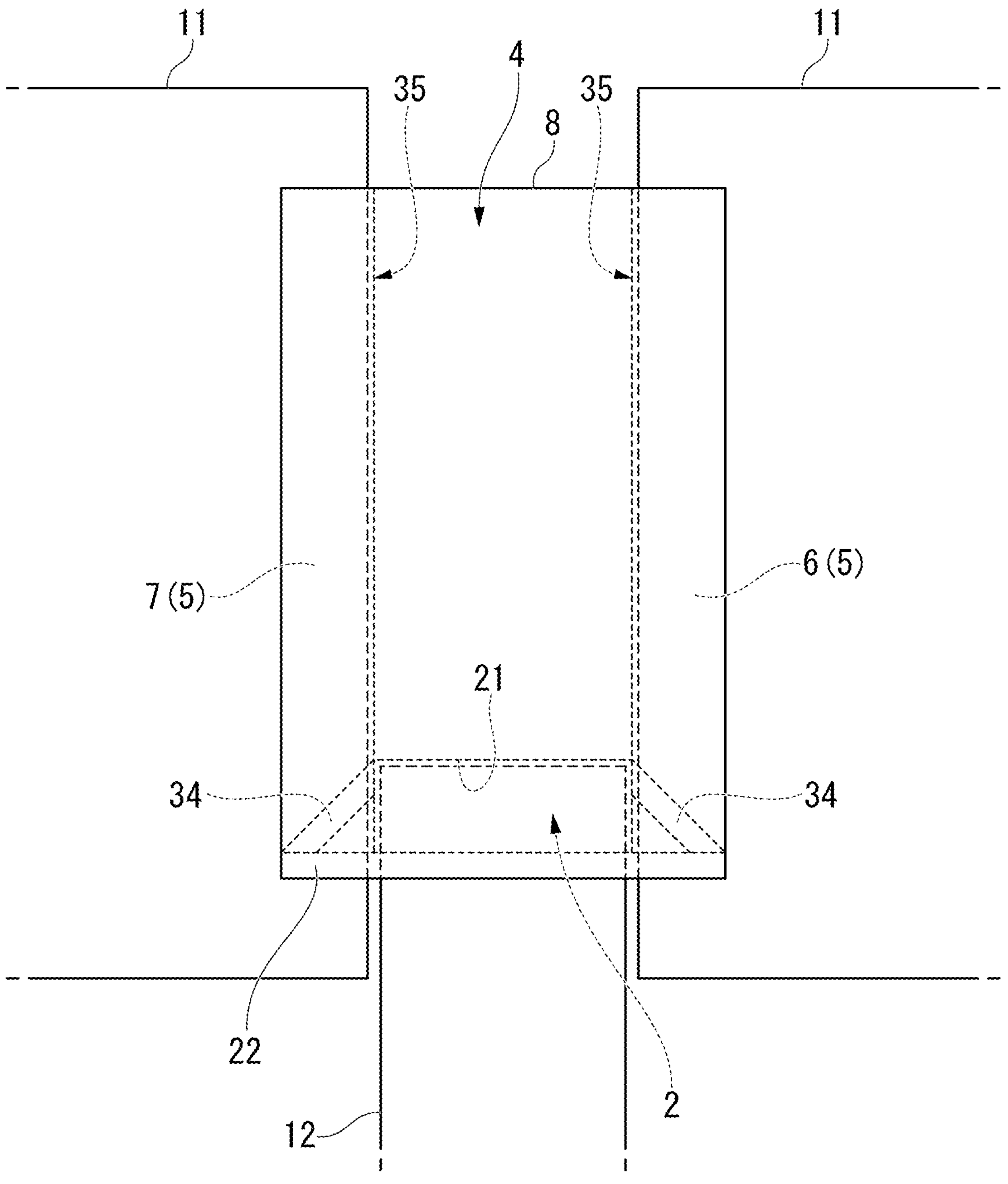
FIG. 12 is a view in a direction of arrow XII in FIG. 11.

FIG. 9 is an explanatory view illustrating a folding start state in the folding step according to the present embodiment. FIG. 10 is a view in a direction of arrow X in FIG. 9. FIG. 11 is an explanatory view illustrating a folding end state in the folding step according to the present embodiment. FIG. 12 is a view in a direction of arrow XII in FIG. 11.

As illustrated in FIGS. 9 to 12, in the folding step, after the unfolding step, the bottom gusset 21 and the side portion gussets 35 are formed by bringing the front 3 and the rear 4 into close contact with each other while thrusting a pair of side portion folding plates 11 facing the pair of sides 5 and a bottom portion folding plate 12 facing the bottom 2 from the outer side of the bag toward the inner side of the bag.

Specifically, as illustrated in FIGS. 9 and 10, in the folding step, first, the side portion folding plate 11 parallel to the unfolding plate 13 is inserted (thrust) from the outer side of the bag toward the inner side of the bag along a central portion in a width direction of each the pair of sides 5. Further, the bottom portion folding plate 12 parallel to the unfolding plate 13 is inserted (thrust) from the outer side of the bag toward the inner side of the bag along a central portion in the width direction of the bottom 2 (direction along the short side of the bottom 2). At this time, the width dimension of the bottom portion folding plate 12 in the left-right direction is smaller than the width dimension of the bottom 2 in the left-right direction is for the most part the same as the distance dimension between both end portions 25*c* of the straight portion 25*a* of the valley fold portion 25 of the bottom gusset 21, and is for the most part the same as a distance dimension between distal ends of the pair of the side portion folding plates 11 when the pair of side portion folding plates 11 that are thrust are closest to each other.

As illustrated in FIGS. 11 and 12, when the insertion of the side portion folding plates 11 and the bottom portion folding plate 12 is started, the pair of unfolding plates 13 are brought close to each other again according to an insertion depth of the side portion folding plates 11 and the bottom portion folding plate 12. After the side portion folding plates 11 and the bottom portion folding plate 12 are inserted to a predetermined depth, the side portion folding plates 11 and the bottom portion folding plate 12 are moved away from the rectangular-bottomed packaging bag 1 by returning the side portion folding plates 11 and the bottom portion folding plate 12 to a state in which they are not thrust while the unfolding plates 13 are closed. Thereby, a three-way gusset bag, which is the rectangular-bottomed packaging bag 1 in a closed state in which the bottom gusset 21 and the side portion gussets 35 that protrude into the bag are formed on the bottom 2 and the side 5, is formed.

Finally, in the fixed sealing step, after the folding step, the bottom joining portion 22 formed on one of the first region 31 and the second region 32 of the side 5 and the side joining portion 33 facing the bottom joining portion 22 are joined by heating and pressing from both sides of the front 3 and the rear 4 in a state in which the side joining portion 33 is sandwiched between the first region 31 and the second region 32 on an inner side of the side portion gusset 35. Thereby, the fixed sealing portion 40 is formed. In the present embodiment, the fixed sealing portion 40 fixes the bottom joining portion 22 of the first region 31 and the side joining portion 33.

[Operation and Effects]

Next, operation and effects of the rectangular-bottomed packaging bag 1 and a method for manufacturing the aforementioned rectangular-bottomed packaging bag 1 are described.

According to the rectangular-bottomed packaging bag 1 of the present embodiment, the pair of sides 5 each include the inclined joining portion 34, and the inclined joining portion 34 inclines toward (approaches) the bottom 2 side from the side joining portion 33 toward the front 3 or the rear 4 and joins the sheet material member overlapping each other in the thickness direction of the side 5. Thereby, when the folded portion 42 of an isosceles right triangle is formed on the side 5, the folded portion 42 can be formed along the inclined joining portion 34. Therefore, a shape of the folded portion 42 can essentially be made into an isosceles right triangle as designed. Therefore, deterioration in the quality of external appearance and self-standing properties of the rectangular-bottomed packaging bag 1 due to the shape of the folded portion 42 being distorted can be inhibited.

The portions at which the inclined joining portion 34 and the bottom joining portion 22 intersect are utilized as base points of the first boundary line L1, the second boundary line L2, the third boundary line L3, and the fourth boundary line L4 which are four sides (four sides extending in the upright direction) of the rectangular-bottomed packaging bag 1. Thereby, positioning of the boundary lines L1, L2, L3, and L4 can be easily performed. In addition, since the corner portions of the bottom 2 are positioned, the shape of the bottom 2 can essentially be made into a rectangular shape as designed. Therefore, occurrence of distortion and wrinkles on the bottom 2 can be inhibited, while improving the self-standing properties of the rectangular-bottomed packaging bag 1.

The equal sides 42*b* of the folded portion 42 and the side 5 positioned on an outer side of the bag from the folded portion 42 are joined by the inclined joining portion 34, and thereby the gap between the folded portion 42 and the side 5 is closed. Therefore, when the inside of the bag is filled with contents, the contents entering the gap between the folded portion 42 and the side 5 can be inhibited. Further, when compared to the conventional technology in which the gap between the folded portion 42 and the side 5 is not closed, it is possible to inhibit deterioration in external appearance quality and self-standing properties of the rectangular-bottomed packaging bag 1 due to the contents entering the gap.

Therefore, it is possible to provide the rectangular-bottomed packaging bag 1 in which an external appearance quality and a self-standing properties are improved compared to conventional technology.

The rectangular-bottomed packaging bag 1 of the present invention preferably has the bottom joining portions 22. The bottom joining portions 22 serves as a footing to improve self-standing properties. Also, end portions of the inclined joining portion 34 positioned on the bottom 2 side are preferably connected to the bottom joining portions 22. Therefore, portions at which the end portions of the inclined joining portion 34 and the bottom joining portions 22 intersect can be used as base points of the folded portion 42, the boundary lines L1, L2, L3, and L4, and the like. Particularly, when these portions are used as base points of the boundary lines L1, L2, L3, and L4, positions of the base points can be made clear compared to a case in which the end portions of the inclined joining portion 34 and the bottom joining portions 22 are not connected. Therefore, the end portions of the inclined joining portion 34 can be utilized more effectively as the base points of the boundary lines L1, L2, L3, and L4. Also, when the bottom joining portions 22 and the inclined joining portion 34 are connected, rigidity and a self-standing properties of the rectangular-bottomed packaging bag 1 can be improved. Therefore, for rectangular-bottomed packaging bag 1, contents can easily be filled therein, and a stability can be maintained even during storage.

The rectangular-bottomed packaging bag 1 of the present invention preferably has the fixed sealing portion 40 that joins the side joining portion 33 and the side 5 (the first region 31 in the present embodiment). Therefore, since the side joining portion 33 protruding outward of the bag with respect to the side 5 is inhibited, an external appearance of the rectangular-bottomed packaging bag 1 can be made satisfactory compared to the conventional technology in which the side joining portion 33 protrudes outward of the bag with respect to the side 5.

The fixed sealing portion 40 is more preferably provided at the lower end portion 33*b* positioned on the bottom 2 side of the side joining portion 33. When the bottom joining portion 22 is provided, the fixed sealing portion 40 is preferably provided on the bottom joining portion 22. An upper portion of the rectangular-bottomed packaging bag 1 is closed with the side portion gusset 35 folded when the contents are filled. Therefore, when the rectangular-bottomed packaging bag 1 is filled with the contents, the side joining portion 33 is in a state in which it is sandwiched between the first region 31 and the second region 32 of the side 5 at the upper portion. When the fixed sealing portion 40 is provided on the bottom joining portion 22, the side joining portion 33 is joined to the first region 31 or the second region 32 at a lower portion of the rectangular-bottomed packaging bag 1. That is, in the upper portion and the lower portion of the rectangular-bottomed packaging bag 1, since the side joining portion 33 is joined to the first region 31 or the second region 32, the side joining portion 33 is in a state of being bent to the first region 31 side or the second region 32 side over the entire length of the side joining portion 33. Therefore, since the side joining portion 33 protruding outward of the bag with respect to the side 5 is inhibited when the rectangular-bottomed packaging bag 1 is filled with contents, an external appearance of the rectangular-bottomed packaging bag 1 can be satisfied.

The bottom 2 has the bottom gusset 21 protruding into the bag, and the sides 5 have the side portion gussets 35 protruding into the bag. Thereby, a three-way gusset bag including one bottom gusset 21 and two side portion gussets 35 is formed. Therefore, in a distribution stage of the rectangular-bottomed packaging bag 1 before contents are filled therein, the rectangular-bottomed packaging bag 1 can be compacted by folding the bottom gusset 21 and the side portion gussets 35 into the bag, so as to save space during storage and when being discarded after use. Also, when the contents are filled, the rectangular-bottomed packaging bag 1 can secure a large storage volume by expanding the bottom gusset 21 and the side portion gussets 35.

According to the method for manufacturing the rectangular-bottomed packaging bag 1 of the present embodiment, the rectangular-bottomed packaging bag 1 is manufactured from the flat bag 10 through the unfolding step and the folding step. Since the flat bag 10 has the inclined joining portion 34, the flat bag 10 can be expanded along the inclined joining portion 34 when the flat bag 10 is expanded in the unfolding step. Therefore, the shape of the folded portion 42 can be made closer to an isosceles right triangle shape as designed. Therefore, deterioration in the quality of external appearance and self-standing properties of the rectangular-bottomed packaging bag 1 due to a distorted shape of the folded portion 42 can be inhibited. Also, since widths of the bottom 2 and the side 5 can be made the same as each other, a shape of the bottom 2 can be formed into a rectangular shape as designed. Therefore, the quality of external appearance and a self-standing properties of the rectangular-bottomed packaging bag 1 can be improved.

In the folding step, the side portion gusset 35 and the bottom gusset 21 can be formed by inserting the side portion folding plate 11 facing the side 5 and the bottom portion folding plate 12 facing the bottom 2 from the outer side of the bag toward the inner side of the bag. Therefore, a three-way gusset bag can be formed from the flat bag 10 with a simple structure.

Therefore, it is possible to provide a method for manufacturing the rectangular-bottomed packaging bag 1 in which an external appearance quality and a self-standing property are improved compared to the conventional technology.

The method for manufacturing the rectangular-bottomed packaging bag 1 preferably includes the fixed sealing step after the folding step. In the fixed sealing step, the bottom joining portion 22 formed in the first region 31 and the side joining portion 33 are joined in a state in which the side joining portion 33 is sandwiched between the first region 31 and the second region 32 on an inner side of the side portion gusset 35. Therefore, the fixed sealing portion 40 can be formed on the side joining portion 33. As such, the side joining portion 33 protruding outward of the bag with respect to the side 5 can be inhibited, and the quality of external appearance of the rectangular-bottomed packaging bag 1 can be improved.

Although present embodiments of the present invention have been described above, the technical scope of the present invention is not limited to the contents of the above-described present embodiments, and various changes or deletions can be made to the components or a combination of the components can be changed beyond the present embodiments within a range not departing from the scope of the present invention. Further, in the following description, components the same as or equivalent to those of the above described present embodiments are denoted by the same reference symbols and description thereof, are simplified or omitted.

The fixed sealing portion 40 may join the side joining portion 33 and the second region 32. It is preferable when the fixed sealing portion 40 are provided in the same region on the right side 6 and the left side 7, as designing the rectangular-bottomed packaging bag 1 thereof is facilitated. Also, the fixed sealing portion 40 may be provided in different regions on the right side 6 and the left side 7. For example, the fixed sealing portion 40 on the right side 6 may be provided in the first region 31, and the fixed sealing portion 40 on the left side 7 may be provided in the second region 32, or vice versa. It is preferable when the fixed sealing portion 40 is provided in different regions on the right side 6 and the left side 7, because the left and right sides can be balanced and self-standing properties of the rectangular-bottomed packaging bag 1 is improved. Also, as an example, the fixed sealing portion 40 may be provided on the entire surface of the side joining portion 33.

A zipper or the like for closing the opening 8 may be separately provided at an upper end portion of the rectangular-bottomed packaging bag 1 at which the opening 8 is positioned. Alternatively, a spout for pouring and discharging contents may be separately provided in the opening 8.

Figure 13:
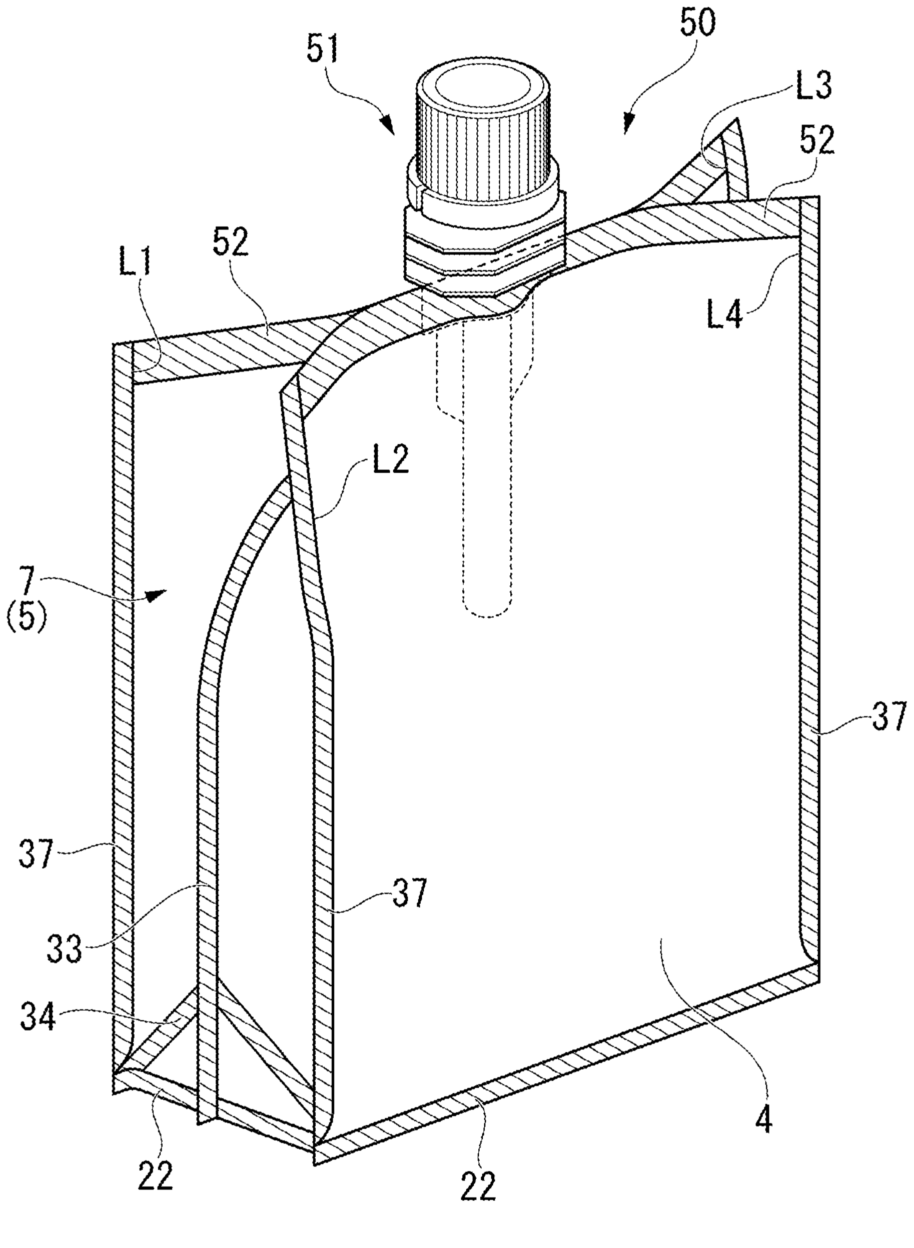
FIG. 13 is an external perspective view of a modified example of the rectangular-bottomed packaging bag according to the present embodiment.
Figure 14:
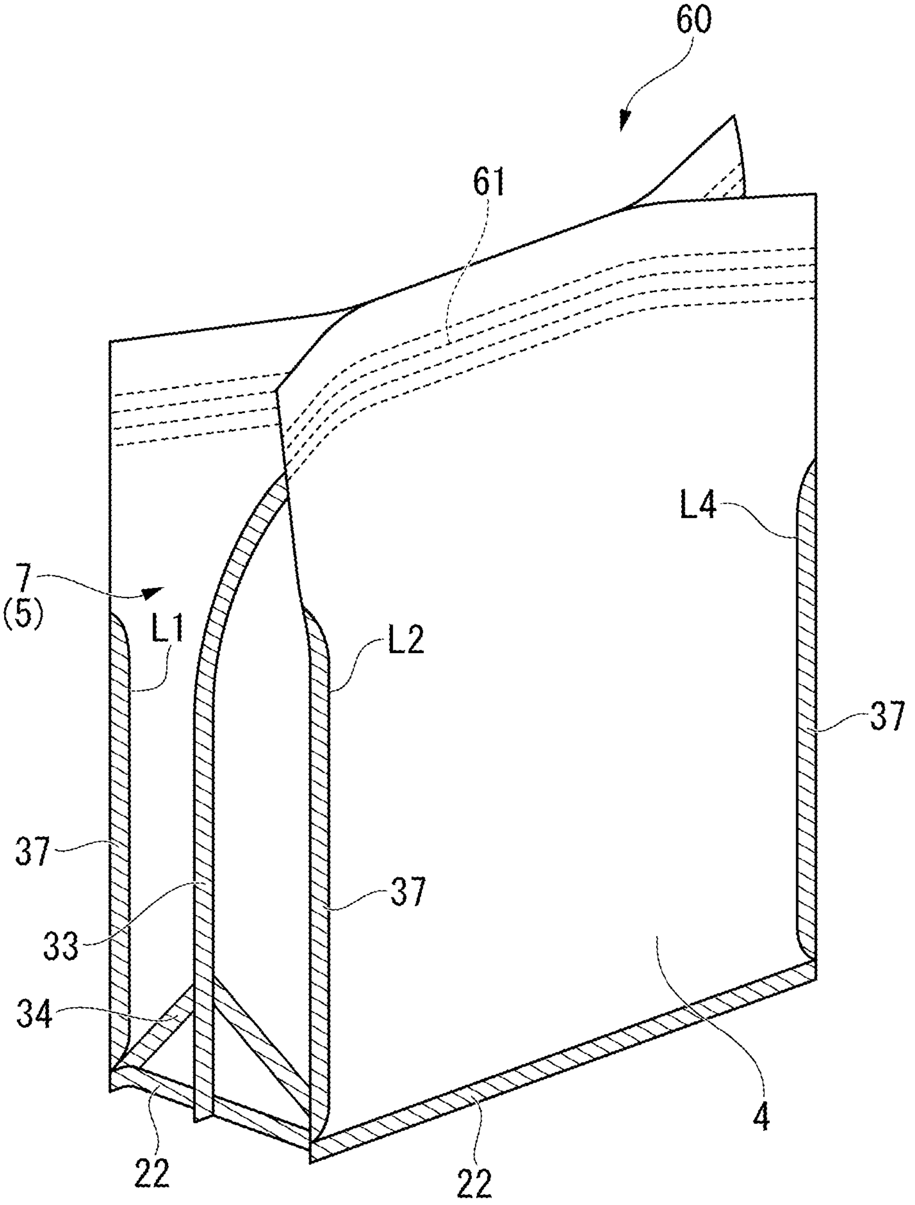
FIG. 14 is an external perspective view of another modified example of the rectangular-bottomed packaging bag according to the present embodiment.

FIG. 13 is an external perspective view of a rectangular-bottomed packaging bag 50 according to a modified example of the present embodiment. FIG. 14 is an external perspective view of a rectangular-bottomed packaging bag 60 according to another modified example of the present embodiment.

As illustrated in FIG. 13, a spout 51 and an upper seal portion 52 are provided at an upper end portion of the rectangular-bottomed packaging bag 50. In the upper seal portion 52, sheet material member facing itself is joined, or the portion of the sheet material member and a part of the spout 51 that are facing are joined. At the upper end portion of the rectangular-bottomed packaging bag 50, the first region 31 and the second region 32 of the side 5 may not be joined, but the base material layers of the sheet material member of the first region 31 and the second region 32 may be joined to each other by the same method as that in the fixed sealing portion 40.

As illustrated in FIG. 14, a zipper 61 is provided at an upper end portion of the rectangular-bottomed packaging bag 60. When the rectangular-bottomed packaging bag 60 is in an unopened stage, an upper portion of the zipper 61 is sealed.

As illustrated in FIGS. 13 and 14, a pillar seal portion 37 in which a part of the sheet material member is fused at a constant width may be provided at portions corresponding to (portions including) the first boundary line L1, the second boundary line L2, the third boundary line L3, and the fourth boundary line L4. The pillar seal portion 37 is formed by, for example, joining heat fusion layers to each other to pinch the sheet material member of each of the portions described above so that the sheet material member protrudes outward of the bag. That is, the front 3 and the rear 4 are connected to the pair of sides 5 via the pillar seal portions 37. In this case, when the pillar seal portion 37 overlaps the bottom gusset 21, since the bottom gusset 21 of the overlapped portion cannot be opened, it is desirable that the pillar seal portion 37 be provided above the bottom gusset 21 not to overlap the bottom gusset 21. When the pillar seal portion 37 is provided in the rectangular-bottomed packaging bag, since the pillar seal portion 37 functions as a pillar supporting the structure of the rectangular-bottomed packaging bag, the self-standing property of the rectangular-bottomed packaging bag can be further improved. In the modified examples of the present embodiment illustrated in FIGS. 13 and 14, the sandwiched portions 45 are provided in the rectangular-bottomed packaging bags 50 and 60 but are omitted from the drawings.

Even if a spout or zipper is not provided in the rectangular-bottomed packaging bag, the pillar seal portion may be provided at portions corresponding to the first boundary line L1, the second boundary line L2, the third boundary line L3, and the fourth boundary line L4 of the rectangular-bottomed packaging bag. Further, if the pillar seal portion extends to the upper end portion of the rectangular-bottomed packaging bag at which the opening 8 is positioned, since an area of the opening 8 becomes smaller than that when there is no pillar seal portion, the pillar seal portion may be provided in a range from a position above the bottom gusset 21 to a position below the opening 8. With such a configuration of the rectangular-bottomed packaging bag, even when the pillar seal portion is provided, the opening 8 can be largely open in a state in which the rectangular-bottomed packaging bag stands on its own, and the contents can be taken out easily.

Also, a zipper for closing the opening 8 so that it is openable and closable may be provided at the upper end portion of the rectangular-bottomed packaging bag at which the opening 8 is positioned, and furthermore, a pillar seal portion in which a part of the sheet material member is fused with a constant width may be provided at each portion including the first boundary line L1, the second boundary line L2, the third boundary line L3, and the fourth boundary line L4. In this case, the pillar seal portion is preferably provided in a range from a position above the bottom gusset 21 to a position below the zipper. When the rectangular-bottomed packaging bag is configured as described above, the opening 8 can be largely opened in a state in which the rectangular-bottomed packaging bag stands on its own without reducing the area of the opening 8 as described above. Further, when the zipper is provided at the upper end portion of the rectangular-bottomed packaging bag with the side 5 pulled out to the outside of the bag and the opening 8 is closed, since the pillar seal portion is not provided at a portion in which the zipper is provided, the opening 8 can smoothly be closed by closing the zipper provided so that it extends linearly.

In the above-described present embodiment, a configuration in which the flat portion and the bottom gusset are made of one sheet material member has been described, but a configuration in which the flat portion and the bottom gusset are made of separate members may also be used.

The laminate constituting the sheet material member may be, for example, a laminate film in which a bi-axially oriented film and a sealant film are laminated together. In this case, the laminate film having a heat fusion layer on one side on which a plurality of films are laminated together may contain a paper material, or may be a mono-material laminate made of a single material. Also, instead of the laminate film, a single-layer film may be used, or a film having heat fusion layers on both surfaces may be used.

In addition, the components in the above-described present embodiments can be appropriately replaced with well-known components within a range not departing from the scope of the present invention, and the present embodiments described above may be appropriately combined.

INDUSTRIAL APPLICABILITY

The present invention can be utilized for a rectangular-bottomed packaging bag formed by folding a sheet material member.

REFERENCE SYMBOL LIST

1, 59, 60 Rectangular-bottomed Packaging Bag
2 Bottom
3 Front
4 Rear
5 Side
10 Flat Bag
11 Side Portion Folding Plate
12 Bottom Portion Folding Plate
15 Flat portion
21 Bottom Gusset
22 Bottom Joining Portion
31 First Region
32 Second Region
33 Side Joining Portion
34 Inclined Joining Portion
35 Side Portion Gusset
40 Fixed Sealing Portion
42 Folded Portion

The invention claimed is:

1. A rectangular-bottomed packaging bag, which is a rectangular-bottomed packaging bag formed by folding a sheet material member, comprising:
a rectangular shaped bottom;
a front and a rear rising from two facing sides of the bottom;
a pair of left and right sides connecting the front and the rear, and
a bottom joining portion provided between the bottom and each of the front, the rear, and the pair of left and right sides,
wherein
the pair of left and right sides each includes:
a first region positioned on the front side;
a second region positioned on the rear side;
a side joining portion joining the first region and the second region; and
a first inclined joining portion inclined to a bottom side from the side joining portion toward the front, and joining the first region and a part of the sheet material member overlapping the first region in a direction of thickness of the first region, and a second inclined joining portion inclined to the bottom side from the side joining portion toward the rear, and joining the second region and a part of the sheet material member overlapping the second region in a direction of thickness of the second region,
an end portion of each of the first inclined joining portion and the second inclined joining portion positioned on the bottom side is connected to the bottom joining portion,
the rectangular-bottomed packaging bag further comprises a fixed sealing portion which joins the side joining portion and the first region or the second region in a state in which an entire region of only the side joining portion in an upright direction is folded towards the front side or the rear side and is disposed parallel to the first region or the second region, the fixed sealing portion being provided on each side of the pair of left and right sides,
the bottom joining portion is formed on a circumferential edge of the bottom at a lower end of the rectangular-bottomed packaging bag, and is provided on an entire circumference of the rectangular-bottomed packaging bag,
the bottom joining portion extends from lower ends of the front, the rear, the left side, and the right side on a same surface as the front, the rear, the left side, and the right side with a constant width,
the entire region of the side joining portion in an upright direction is positioned on an outer surface of the rectangular-bottomed packaging bag,
the fixed sealing portion joins only a portion of the bottom joining portion in the side joining portion and a portion of the bottom joining portion in the first region or the second region at a lower portion of the rectangular-bottomed packaging bag,
in the fixed sealing portion, the sheet material member is a laminate in which
an outermost layer thereof has heat fusibility,
when the rectangular-bottomed packaging bag is filled with contents, the side joining portion is closed at the upper portion of the rectangular-bottomed packaging bag in a state in which it is sandwiched between the first region and the second region, and
other than the upper portion and the lower portion of the rectangular-bottomed packaging bag, the side joining portion is not joined to the first region or the second region.

2. The rectangular-bottomed packaging bag according to claim 1, wherein
the bottom includes a half-folded bottom gusset which protrudes into the bag between the front and the rear, and the side includes a half-folded side portion gusset which protrudes into the bag between the front and the rear.

3. A method for manufacturing the rectangular-bottomed packaging bag according to claim 2, comprising:

an unfolding step of unfolding a flat bag so that the front, the rear, and the pair of left and right sides are formed from a pair of flat portions, the bottom is formed by opening the bottom gusset folded in half, and an isosceles-triangle-shaped folded portion is formed along the first inclined joining portion and the second inclined joining portion by separating the pair of flat portions of the flat bag including the half-folded bottom gusset provided between the pair of flat portions, the side joining portion in which both end edges of the pair of flat portions are joined, the bottom joining portion in which the pair of flat portions and a circumferential edge portion forming a boundary with the bottom gusset are joined, and the first inclined joining portion and the second inclined joining portion connecting obliquely between the side joining portion and the bottom joining portion; and a folding step of forming the bottom gusset again and forming the side portion gusset by bringing the front and the rear into close contact with each other while thrusting a pair of side portion folding plates facing the pair of left and right sides and a bottom portion folding plate facing the bottom from an outer side of the bag toward an inner side of the bag after the unfolding step.

4. The method for manufacturing the rectangular-bottomed packaging bag according to claim 3, further comprising a fixed sealing step of joining the bottom joining portion formed in one of the first region and the second region, and the side joining portion in a state in which the side joining portion is sandwiched between the first region and the second region on an inner side of the side portion gusset after the folding step.

5. The rectangular-bottomed packaging bag according to claim 1, wherein a spout is provided at an opening of the rectangular-bottomed packaging bag.

6. The rectangular-bottomed packaging bag according to claim 1, wherein a zipper is provided at an opening of the rectangular-bottomed packaging bag.

7. The rectangular-bottomed packaging bag according to claim 1, wherein a pillar seal portion in which a part of the sheet material member is fused at a constant width is provided at a portion including each of boundary lines which are boundaries between the front and the rear, and the pair of left and right sides.

8. The rectangular-bottomed packaging bag according to claim 1, wherein a pillar seal portion in which a part of the sheet material member is fused at a constant width is provided at a portion including each of boundary lines which are boundaries between the front and the rear, and the pair of left and right sides, a zipper is provided at an opening of the rectangular-bottomed packaging bag, and the pillar seal portion is provided below the zipper.

* * * * *